United States Patent [19]
Pinto

[11] Patent Number: 4,469,665
[45] Date of Patent: Sep. 4, 1984

[54] PRODUCTION OF AMMONIA FROM PURIFIED AMMONIA SYNTHESIS GAS

[75] Inventor: Alwyn Pinto, Middlesbrough, England

[73] Assignee: Imperial Chemical Industries PLC, London, England

[21] Appl. No.: 448,475

[22] Filed: Dec. 10, 1982

Related U.S. Application Data

[63] Continuation of Ser. No. 214,793, Dec. 9, 1980.

[30] Foreign Application Priority Data

Dec. 19, 1979 [GB] United Kingdom ............... 7943634

[51] Int. Cl.³ .................................................. C01C 1/04
[52] U.S. Cl. .............................. 423/359; 423/648 R; 423/650
[58] Field of Search ............... 423/359–363, 423/648 R, 650–658; 252/373; 518/705; 55/33, 31

[56] References Cited

U.S. PATENT DOCUMENTS

| | | | |
|---|---|---|---|
| 2,629,460 | 2/1953 | Maki | 55/33 |
| 3,150,942 | 9/1964 | Vasan | 55/33 X |
| 3,350,170 | 10/1967 | Finneran et al. | 423/359 |
| 3,388,968 | 6/1968 | Spielman et al. | 423/360 |
| 3,598,527 | 8/1971 | Quartulli et al. | 423/656 X |
| 4,242,317 | 12/1980 | Pinto | 423/359 |

FOREIGN PATENT DOCUMENTS 215789 10/1924 United Kingdom .

OTHER PUBLICATIONS

Kirk–Othmer Encyclopedia of Chemical Technology, 3rd Ed., vol. 2, 1978, pp. 494–500.
Kirk–Othmer Encyclopedia of Chemical Technology, 3rd Ed., vol. 8, 1979, pp. 125–127.

*Primary Examiner*—Edward J. Meros
*Assistant Examiner*—Steven Capella
*Attorney, Agent, or Firm*—Cushman, Darby & Cushman

[57] ABSTRACT

A moist hydrogen stream is dried by cooling to below the dewpoint of water and separating water, drying further over a regenerable solid absorbent, separating a part stream of dried gas and using it to regenerate water-loaded absorbent, and recycling the resulting moist regeneration gas stream into the moist hydrogen stream upstream of the water separation step. If the starting moist hydrogen stream is produced by shift, $CO_2$-removal and methanation the recycled gas is preferably introduced between $CO_2$ removal and methanation. If it is produced from unreacted methanol synthesis gas the recycled gas is preferably introduced upstream of methanol synthesis.

1 Claim, 1 Drawing Figure

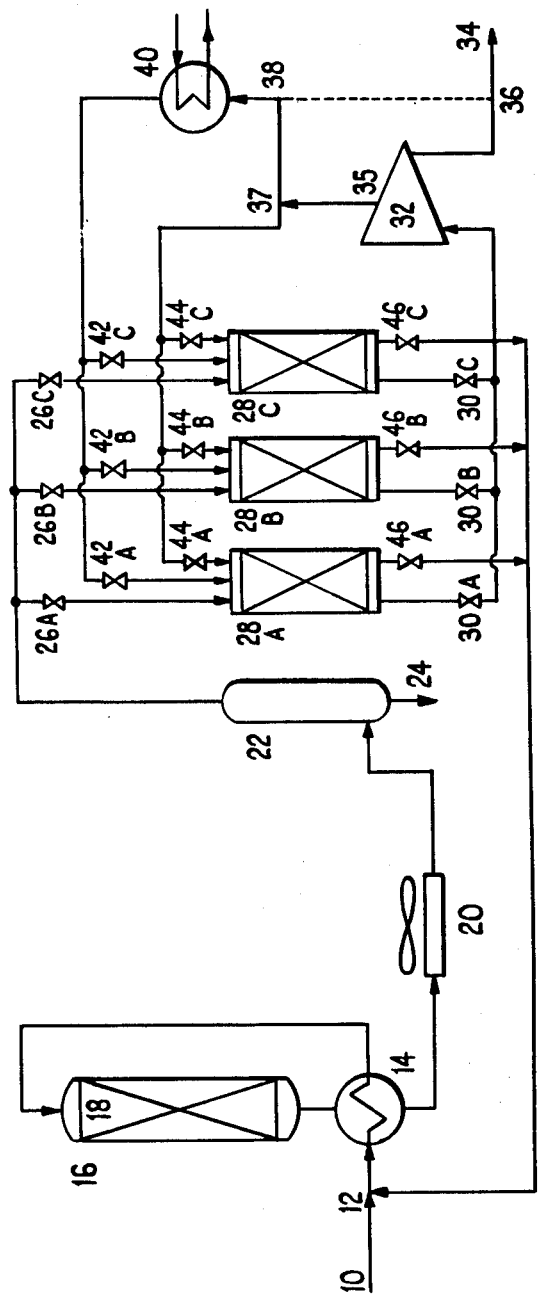

PRODUCTION OF AMMONIA FROM PURIFIED AMMONIA SYNTHESIS GAS

This is a continuation of application Ser. No. 214,793, filed Dec. 9, 1980.

This invention relates to the purification of hydrogen and in particular to a process for drying a hydrogen-containing gas.

Many of the processes used or proposed for making a hydrogen-containing gas, for example ammonia synthesis gas, synthesis gases containing carbon monoxide, and hydrogen streams for hydro-treating or hydrogenation, produce a steam-containing gas as a result of carbon dioxide removal by means of an aqueous solution or of carbon oxides removal by methanation. As much as practicable of the steam is condensed and separated, but residual moisture is often objectionable and has to be removed by passing the gas over a regenerable solid absorbent or, as in an ammonia synthesis process, by contacting the gas with the liquid product of the process. The solid absorbent method is preferable because it does not require additional cooling but regeneration of the absorbent requires a supply of dry gas, which has not been readily recoverable.

We have now devised a process by which regeneration can be carried out by means of a dry gas already available and without discarding the regeneration gas.

According to the invention a moist hydrogen stream is dried by the steps of:
(a) cooling it to a temperature below its dewpoint;
(b) separating water from it;
(c) passing the water-depleted gas through a charge of regenerable solid water absorbent until that absorbent is loaded with water and then switching the gas flow to pass through a fresh or regenerated charge of absorbent;
(d) separating a part stream of dry gas downstream of step (c) and passing it through a water-loaded charge of absorbent whereby to regenerate the absorbent and produce a moist regeneration gas stream;
(e) recycling that moist regeneration gas stream into the starting moist hydrogen stream or a precursor thereof at a point upstream of water separation step (b).

By this procedure water leaves the process only in separation step (b), but no hydrogen-containing gas leaves it.

The point upstream of the water separation step (b) at which the recycled moist regeneration gas is introduced depends on what treatment steps the hydrogen stream or precursor thereof has undergone further upstream. For the simplest example, a hydrogen stream produced by electrolysing an aqueous solution, there are few possibilities. For a process involving the steps of catalytic shift reaction of carbon monoxide with steam, carbon dioxide removal in an absorbent liquid and carbon oxides removal by catalytic methanation, it can be introduced just before any one or more of these steps.

In a preferred process the recycled moist regeneration gas is introduced between carbon dioxide removal and methanation. One advantage of this is that any carbon monoxide or dioxide present in the gas after methanation and taken up by the solid absorbent is recycled and converted to methane and thus removed. Another advantage is that the temperatures of the regeneration gas need not be adjusted before admission to the methanator or to the cold side of its feed/effluent heat exchanger.

If the recycled regeneration gas is introduced upstream of a shift stage it may assist by decreasing the steam to gas ratio without significantly increasing the carbon oxides content of the gas. This effect is useful when the shift step concerned takes place over a copper containing catalyst at under 300° C. and the pressure is relatively high, for example 30 to 80 atm abs. so that extra care has to be taken to avoid condensation of water on the catalyst.

If the moist starting hydrogen stream is generated by a process sequence beginning with catalytic reaction of desulphurised hydrocarbons with steam, the regeneration gas can be introduced still further upstream, for example, at a preliminary hydrodesulphurisation step or at a steam/hydrocarbon reaction step. However, it is usually preferred to introduce the gas as near as possible to the gas drying step, in order to enable upstream steps to be started up and operated independently of steps so far downstream as the drying step.

The invention can be very conveniently used in a process involving reacting a gas containing one or more carbon oxides and hydrogen over a methanol synthesis catalyst to give incomplete conversion to methanol, separating the methanol and converting the unreacted gas to a moist hydrogen stream which is ammonia synthesis gas or a stream containing at least 75, especially at least 90% v/v of hydrogen. In such a process the recycled moist regeneration gas is preferably introduced upstream of the methanol synthesis step. If the starting gas has been compressed from the pressure at which it is generated to the pressure of the methanol synthesis, the recycled moist regeneration gas is preferably introduced into the compressor used therefor. Such a point of introduction is especially suitable when the ammonia synthesis gas or the hydrogen stream is used without further compression or with only moderate compression, for example by up to 50%, since it enables the regeneration gas to be recovered without using an additional compressor.

For step (d) the separation of the part stream of dry gas is preferably at a stage before the gas has undergone treatments introducing other constituents. Thus, for example, in an ammonia synthesis process the part stream is separated preferably before the gas has undergone reaction to form ammonia or has been mixed with ammonia-containing gas; if ammonia were present it could form unwanted deposits of ammonium carbonate or could be dissolved in the water separated in step (b), thus precluding discharge of such water to drains or rivers. Most conveniently the separation of the part stream is effected during or just after a compression step applied to the dried gas immediately downstream of the solid absorbent. If there is no compression step, the part stream is taken just downstream of the solid absorbent and recycled with the aid of a pump or possibly by means of an injector at the point in the moist hydrogen stream at which it is to be readmitted. Such a pump or injector is used if regeneration of the absorbent is effected at a pressure lower than that at which it is contacted with moist gas.

The pressure of the starting moist hydrogen stream is suitably in the range 10–100, more conveniently 15–40 bar abs, such as obtains when it has been made by catalytic steam reforming of hydrocarbons or partial oxidation of a carbonaceous fuel, followed by steps of carbon oxides removal as mentioned above. If it is unreacted gas from methanol synthesis its pressure is usually higher, for example in the range 30–120 bar abs. when using a copper-containing methanol synthesis catalyst or 150-450 bar abs. when using a copper-free catalyst such as zinc chromite. If the dried gas is used in ammonia synthesis, its pressure is typically up to 150, especially in the range 50-120 bar abs.

The regenerable solid absorbent may be any hydratable oxide, for example alumina, silica gel, amorphous aluminosilicates and crystalline aluminosilicates, that loses water at temperatures up to 450° C., the highest temperature conveniently attainable in process in which the invention can be applied. Active carbon can be used, if desired. Compounds such as sodium hydroxide and potassium hydroxide are less convenient owing to their relatively low melting points. Among the crystalline aluminosilicates the zeolites are especially suitable. Small-pore zeolites such as zeolites of the A type (for example 3A and 5A), chabazite and erionite, medium-pore zeolites such as mordenite and those of the ZSM-5 family, and also large pore zeolites such as zeolites X, Y and omega can be used.

Each change of solid absorbent can contain more than one material. It is also within the invention to use two or more charges in parallel, so that, for example in drying, a large proportion of the gas flows through one charge and is dried by it and a small proportion flows through the other and prepares it for use by cooling it from its regeneration temperature to the temperature of the gas being dried. Similarly in regeneration part of the gas flow can be through one charge, which it regenerates, while part is through the other charge, which it heats preparatory to regeneration. In an economical process there charges are used, which at any point in time are used in three different duties respectively drying synthesis gas, being regenerated and being cooled after regeneration. In a preferred arrangement two charges are used in parallel for drying synthesis gas and these are operated out of step by half the water-loading time. Very suitably the gas flow rates and temperatures in regeneration and cooling are chosen so that both regeneration and cooling take place within the water-loading time or, in the preferred arrangement, half that time. By such arrangements it is possible to avoid fluctuations in gas temperature and in efficiency of regeneration at times of switching gas flows from the first to the second charge.

The accompanying drawing is a flowsheet of one preferred process according to the invention, as used in producing compressed dry ammonia synthesis gas or, analogously, nitrogen-free hydrogen.

Ammonia synthesis fresh gas made for example by the known succession of steps $CH_4 + H_2O \rightarrow CO + 3H_2$ (primary steam reforming)

$CH_4 + (O) + 2N_2 \rightarrow CO + 2H_2 + 2N_2$ (secondary reforming)

$CO + H_2O \rightarrow CO_2 + H_2$ (shift: high temperature followed by low temperature)

cooling and steam removal.

$CO_2$ absorption in aqueous potassium carbonate is fed to the process by line 10. It contains typically, by volumes percent: hydrogen and nitrogen in the ratio 3:1, fractional percentages of methane and noble gases and as objectionable impurities 0.3 of CO, 0.2 of $CO_2$ and residual $H_2O$, and is united with a moist recycle gas stream at point 12. The mixed stream is heated to methanation inlet temperature (typically 250°-300° C.) in feed/effluent heat exchanger 14 and passed into reactor 16 which contains bed 18 of supported nickel methanation catalyst. The methanation reactions $CO + 3H_2 \rightarrow CH_4 + H_2O$ $CO_2 + 4H_2 \rightarrow CH_4 + 2H_2O$ take place substantially to completion, giving a gas of increased moisture content, usually under 10 ppm each of CO and $CO_2$. The gas is cooled at 14 in heat exchange with feed gas, cooled by air at 20 and passed to catchpot 22 in which water condensed at 20 is separated and run off at 24, usually to waste because its quantity is too small to make recovery worth while. The water-denuded gas is passed via valve 26A into drier 28A, and dried gas leaves via valve 30A. (Valves 26B, 26C, 42A, 44A and 46A are closed at this stage of operation, as shown in the Table below). The dried gas is compressed in compressor 32 and passed out at 34 to ammonia synthesis (not shown). A side stream is taken from compressor 32 at 35 and divided further at 37 into a regeneration stream and a cooling stream. (If the pressure increase in compressor 32 is small, the side stream can be taken downstream of it at 36 and passed to dividing point 38 via the dotted path). The regeneration stream is heated in heat exchanger 40 and passed via valve 42B into drier 26B, which has been loaded with water in a preceding stage of operation. (Valves 42A, 42C, 44B and 30B are closed). The resulting moist regeneration gas leaves drier via valve 46B and passes to point 12 where it is united with fresh gas fed in through line 10. The mixed gas entering methanation reactor 16 contains more water vapour than the fresh gas, but the free energy decrease in the methanation reactions is so large that the carbon oxides content of the gas leaving catalyst 18 is for practical purposes no higher than in prior processes in which only fresh gas is methanated.

At the same time as drier 28A is drying the synthesis gas and drier 28B is being regenerated a small stream (cooling stream) of gas from point 38 is passed into drier 28C via valve 44C to lower its temperature after regeneration to the level required for synthesis gas drying. The warmed cooling stream leaves drier 28C via valve 46C and passes to point 12 along with the moist regeneration gas from drier 28C. (Valves 44A, 44B and 30C are closed).

Operation with drier 28B on drying duty (and later on drier 28C) can be readily envisaged by analogy.

TABLE

| Duties of vessels | | Open valves | | | | |
|---|---|---|---|---|---|---|
| | | 26 | 30 | 42 | 44 | 46 |
| Drying | 28A | A | A | | | |
| Regeneration | 28B | | | B | | B |
| Cooling | 28C | | | | C | C |
| Drying | 28C | C | C | | | |
| Regeneration | 28A | | | A | | A |
| Cooling | 28B | | | | B | B |
| Drying | 28B | B | B | | | |
| Regeneration | 28C | | | C | | C |
| Cooling | 28A | | | | A | A |

A similar scheme can be used if the feed to the shift reaction is unreacted gas from methanol synthesis.

I claim:
1. In a process for producing ammonia by ammonia synthesis gas generation by catalytic primary reforming of desulphurised hydrocarbons with steam secondary reforming with air of the product of primary reforming whereby to introduce nitrogen, catalytic shift reaction of carbon monoxide with steam, cooling and steam removal, carbon dioxide removal in an absorbent liquid, carbon oxides removal by catalytic methanation and final removal of residual water vapour and carbon dioxide, followed by catalytic ammonia synthesis from the synthesis gas; the improvement wherein such ammonia synthesis is at a pressure in the range 50–120 bar Abs., by which such residual water vapour and carbon dioxide are removed more efficiently than by conventional contacting with the liquid ammonia product of the process, which comprises (a) cooling the product of methanation to below its dewpoint;
(b) separating water from it;
(c) passing the water-depleted gas containing residual carbon dioxide through a charge of solid absorbent absorbing water vapour and carbon dioxide while leaving nitrogen unabsorbed until the absorbent is loaded with said water and carbon dioxide and then switching the gas flow to pass through a fresh or regenerated charge of absorbent;
(d) separating a part stream of gas downstream of step (c) and passing it through a loaded charge of absorbent whereby to regenerate the absorbent and produce a regeneration gas stream containing water vapour and carbon dioxide;
(e) recycling said regeneration gas stream into the process between said carbon dioxide removal and said methanation, whereby carbon dioxide in said gas is converted to methane, water vapour is removed in separation step (b) and synthesis gas contained therein is re-united with the main synthesis gas stream.

* * * * *